Nov. 5, 1963    A. C. SAMPIETRO    3,109,668
STEERING LINKAGE
Filed Aug. 13, 1962

INVENTOR.
Achilles C. Sampietro.
BY
Harness, Dickey & Pierce
ATTORNEYS.

United States Patent Office 3,109,668
Patented Nov. 5, 1963

3,109,668
STEERING LINKAGE
Achilles C. Sampietro, Bloomfield Hills, Mich., assignor to Willys Motors, Inc., Toledo, Ohio, a corporation of Nevada
Filed Aug. 13, 1962, Ser. No. 216,352
4 Claims. (Cl. 280—89)

This invention relates to steering linkages, and more specifically to steering linkages for use with automotive vehicles.

In many instances automotive vehicles are subjected to severe driving conditions, i.e. such as experienced in off the road applications, in which loads of high magnitude occur at the wheels of the vehicle. If these loads are of high enough magnitude and in the proper direction, the result can be permanent damage to the steering linkage thereby incapacitating the vehicle or requiring adjustment and/or repair. Therefore, it is an object of this invention to provide means for use in the steering linkage whereby damage to the steering linkage due to high side loads at the wheels is prevented.

In driving automotive vehicles in off the road use and/or other severe types of road conditions, high loads from the road, as applied to the wheels, are transmitted to the steering linkage, through the steering gear mechanism, and back to the operator, resulting in a condition called "wheel fight." Therefore, it is another object of this invention to provide means for use with a steering linkage whereby severe loads applied to the steering linkage are partially absorbed or damped thereby reducing wheel fight to the operator.

Other objects, features and advantages of the present invention will become apparent from the subsequent description and the appended claims taken in conjunction with the accompanying drawings in which:

Figure 1:
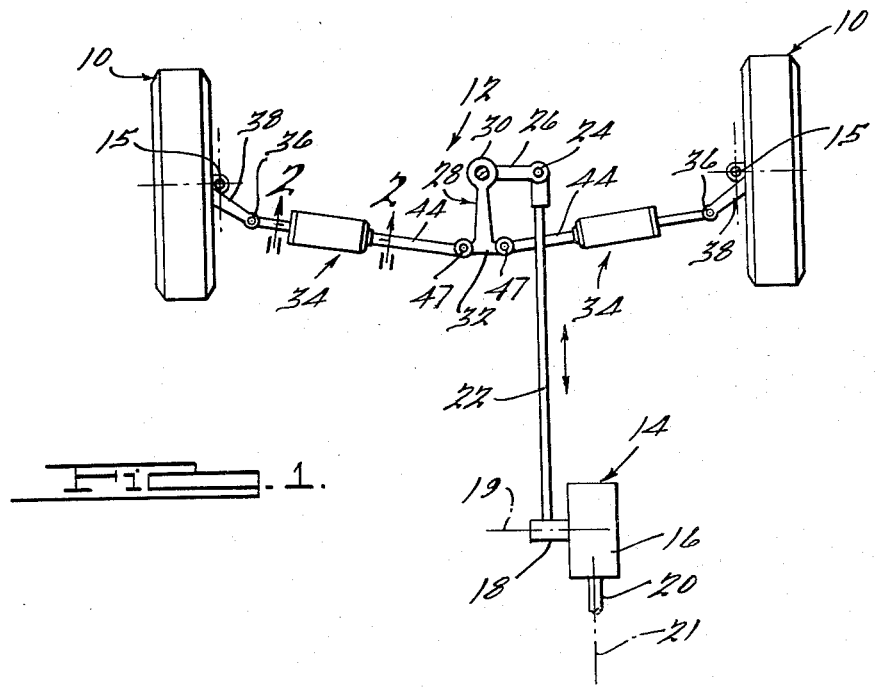
FIGURE 1 is a schematic type presentation depicting the interrelationship between the wheel assemblies, steering linkage and steering mechanism of the vehicle.

Looking now to FIGURE 1, a pair of steerable wheel assemblies 10 are each connected by means of a steering linkage 12 to a steering gear mechanism 14 whereby the wheel assemblies 10 can be pivoted about steering axes 15 to provide steering for the automotive vehicle (not shown) with which they are associated. The steering axes 15 can be determined by selecting the desired arrangement of suspension components (not shown) and for the sake of simplicity will be assumed to extend into the plane of the paper at the points 15.

The steering mechanism 14 has a steering gear 16 which can be of a conventional construction which has a bell crank 18 which pivots about an axis 19 in response to rotation by the operator of a steering tube 20 about the axis 21. The bell crank 18 is in turn pivotally connected to one end of a connecting link 22 whereby the rotational motion of the bell crank 18, as caused by rotation of the steering tube 20, is converted to translatory motion in the connecting link 22. The opposite end of the connecting link 22 is connected by means of a ball joint 24, having a construction well known in the art, to the end of an arm portion 26 of a connecting arm 28. The connecting arm 28 is pivotally secured about a boss portion 30 to the frame or chassis of the vehicle (not shown) and has a transverse link portion 32 extending from the boss 30 transversely with respect to the arm portion 26. Pivotally secured by ball joints 47 on opposite sides of the link portion 32 are a pair of oppositely extending connecting link assemblies 34. The connecting link assemblies or spring means 34 in turn are connected by means of ball joints 36 to steering arms 38 each of which is connected to one of the wheel assemblies 10. Thus, as the steering tube 20 is rotated causing the bell crank 18 to pivot, the connecting link 22 is moved in translation causing the arm portion 26 to be rotated about the axis of the boss 30 and hence causing the transverse link portion 32 of the connecting arm 28 to be rotated about the axis of the boss 30. This in turn causes the connecting link assemblies 34 to be moved substantially in translation causing the steering arms 38 and the wheel assemblies 10 to be rotated about the steering axes 15.

Figure 2:
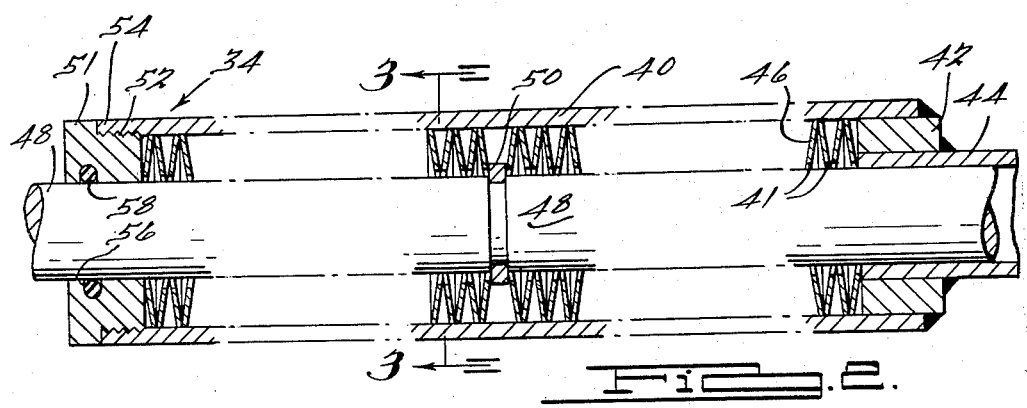
FIG. 2 is a blown up sectional view depicting a portion of the steering linkage mechanism of FIGURE 1 and taken substantially along the line 2—2 in FIGURE 1.
Figure 3:
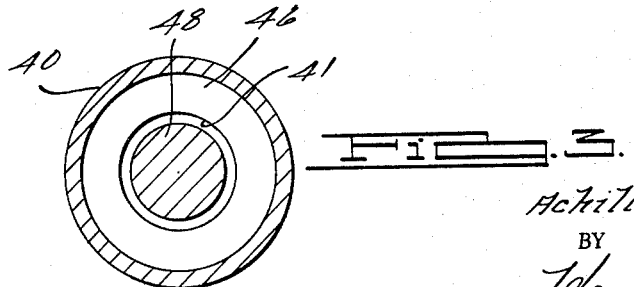
FIG. 3 is a sectional view of a portion of the steering linkage of FIGURE 2 taken substantially along the line 3—3 in FIGURE 2.

A portion of the connecting link assembly 34 is shown in FIGURE 2. A tubular outer shell member 40 has a circular plug 42 welded or otherwise fixed to one end. A connecting tube 44 has one end welded into an aperture in the plug and, while only partly shown in FIGURE 2, is connected at its opposite end to the transverse link portion 32 of the connecting arm 28 via the ball joint 47. Concentrically disposed within the outer housing or shell 40 are a plurality of partially spherically contoured or dished washers 46 each having a central aperture 41 and of the type commonly known as Belleville washers. The Belleville washers 46 are arranged in pairs with their concave faces in confronting relationship to provide a construction as shown in FIGURE 2. The outer diameter of the Belleville washers 46 is slightly less than the inside diameter of the outer shell 40 to facilitate their insertion therein. A connecting rod 48, partially shown in FIGURE 2, has one end connected to the steering arm 38 via the ball joint connection 36 (FIGURE 1) and has its other end extending centrally through the shell 40, through all of the coaxially aligned apertures 41 of the Belleville washers 46 (FIGURE 3) and into telescoping sliding engagement within the connecting tube 44. Secured to the connecting rod 48 is a drive ring 50 which, in the preferred embodiment, is located at a point midway between the Belleville washers 46 disposed within the housing 40. The ring 50 extends radially outwardly from the connecting rod 48 such as to be in engagement with the two of the Belleville washers 46 which are located immediately adjacent thereto and on opposite sides thereof.

A threaded cap 51 has a central bore which slidably receives the connecting rod 48 and has an externally threaded portion 52 which is threadably engageable with an internally threaded portion 54 of the outer shell member 40 to close that end of the outer shell 40. As the cap 51 is threaded into the threaded portion 54, the Belleville washers 46 are moved into compressive engagement with each other. The cap 51 is threaded inwardly to a position at which the compressive preload is at a predetermined value, for reasons to be presently seen. The Belleville washers 46 are resilient and act as a spring such that the pluralities of Belleville washers 46 on opposite sides of the drive ring 50 act as a pair of opposed spring members. By moving the cap 51 axially into the shell 40, a compressive preload is applied to the Belleville washers 46 on both sides of the drive ring 50. In the preferred embodiment the Belleville washers 46 are arranged on opposite sides of the drive ring 50 such as to provide a pair of springs each having substantially the same spring rate. Thus as the cap 51 is moved into the shell 40, the oppositely disposed Belleville washer springs are deflected substantially equally and a substantially equal preload is applied to each of these springs on opposite sides of the drive ring 50. The result is that the net relative movement and force between the connecting tube 44 and the connecting rod 48 is substantially zero. This prevents any preload from being applied to the steering linkage components. It can be appreciated, however, that as the drive ring 50 is moved in either direction one spring is allowed to expand and decrease its preload while the second spring is placed under additional compression. The force required to move the drive ring 50, and hence the connecting rod 48 relative to the connecting tube 44, is a combination of two forces: (1) the force required to additionally compress the second spring, and (2) the force required to overcome the preload of the second spring which is no longer counterbalanced by the first spring as a result of the precompression on the first spring being partially released. With balanced, opposed springs, the result of the preload is to effectively double the spring rate (i.e., pounds/inch) over the load range of the preload. With such a construction, individual springs of a smaller spring rate and hence smaller size, etc., can be utilized than if separate springs in a non-opposed construction were utilized. The opposed spring construction as shown in the drawings offers another advantage in that the spring can be caused to vary over the effective load range (i.e., since once the preload would be completely overcome, the load would be resisted simply by the spring rate of one spring).

Side loads to either of the wheel assemblies 10 which tend to pivot the wheel assemblies 10 about their axes 15 are transmitted via the steering arms 38 to the connecting link assemblies 34. For the sake of convenience these side loads can be thought of as reverse steering loads as applied to the wheels via the ground. For normal road loads the combined spring rate (including preload) of the pair of springs is selected to be sufficiently high such as to allow only slight deflection. However, as the side loads applied to the wheel assemblies 10 increase in magnitude, the relative movement between the connecting tube 44 and the connecting rod 48 increases; this relative movement causes compression of one of the pair of Belleville washer springs and at the same time allows the preload of the other spring to decrease which, as previously mentioned, results in an increase in the total force resisting the side load. Relative movement between the connecting tube 44 and connecting rod 48 will occur in a direction depending upon the direction of the load applied to the wheel assemblies 10. By so allowing deflection of the wheel assemblies 10, damage, which might otherwise occur if a solid connection were maintained, is prevented. By means well known in the art the maximum side loads to be expected under the severest, yet feasible, conditions can be determined. Likewise, that load at which damage to the steering linkage will start to occur can also be determined. The combined spring rate (including pre-load) of the Belleville washers is selected such that no damage will occur to the steering linkage over the entire feasible load range while the relative movement between the connecting rod 48 and the connecting tube 44 for the maximum load is maintained at a minimum. The spring rate of the Belleville washer springs can be set by properly selecting the size, thickness, number, etc., of Belleville washers 46 employed on both sides of the driving ring 50.

The housing 40 is completely filled with grease and the cap 51 has an O-ring seal 58 disposed in a radial groove in the bore 56 such as to prevent leakage of the grease between the bore 56 and the connecting rod 48. By filling the housing 40 with grease, the road loads tend to be damped and absorbed, thus reducing wheel fight.

Thus a construction has been shown in which damage to the steering linkage due to high side loads on the wheel assemblies is prevented and also a construction in which wheel fight is lessened by damping the high road loads incident at the wheel assemblies.

While this invention is depicted in conjunction with a steering linkage for a front wheel steer vehicle, it has equal application for a vehicle having rear wheel steering as well. It is common practice on four wheel steer vehicles to have means for locking up the rear wheels to permit only front wheel steering. With the rear steering linkage held rigid, road loads of high magnitude could cause damage; by the proper design of the rear linkage, including the connecting link assembly 34 in the manner previously described, damage can be prevented to the rear linkage.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a vehicle having steerable wheels each rotatable about a steering axis, the combination including steering means operable for steering each wheel, steering linkage means connected to each wheel and to said steering means for moving each wheel about its steering axis responsively to actuation of said steering means, said steering linkage means including each of a plurality of spring means individual to one wheel for resiliently resisting rotative movement of that one of the wheels about its steering axis responsively to reverse steering loads thereon, said spring means including a connecting tube assembly and a connecting rod movable coaxially, telescopically relative to each other, a drive ring extending radially, outwardly from and fixedly secured to said connecting rod, each of a pair of springs disposed in opposition to each other on opposite sides of and between said drive ring and said connecting tube assembly for simultaneously urging said connecting tube assembly and said connecting rod in opposite relative directions, said connecting tube assembly including a connecting tube secured at one end to an enlarged diameter outer shell for housing said pair of springs, said each of said pair of springs comprising a plurality of dished washers arranged in concavely confronting pairs and in which said shell is filled with grease, and with said combination further including means for sealing both ends of said shell.

2. The combination of claim 1 in which both of said pair of springs have substantially the same spring rate.

3. In a vehicle having steerable wheels each rotatable about a steering axis, the combination including steering means operable for steering each wheel, steering linkage means connected to each wheel and to said steering means for moving each wheel about its steering axis responsively to actuation of said steering means, said steering linkage means including each of a plurality of spring means indivdiual to one wheel for resiliently resisting rotative movement of that one of the wheels about its rotative axis responsively to reverse steering loads thereon, said each of said spring means including a connecting tube assembly, a connecting rod movable coaxially, telescopically relative to said connecting tube assembly and having radially outwardly extending drive means for transmitting loads to said connecting rod, and each of a pair of springs disposed in opposition to each other on opposite sides of said drive means and between said drive means and said connecting tube assembly for simultaneously urging said connecting tube assembly and said connecting rod in opposite relative directions, said connecting tube assembly including a connecting tube secured to one end of an enlarged diameter outer shell for housing said pair of springs and means on the end of said shell opposite said one end for substantially closing said one end of said shell and being selectively movable for applying a preselected preload to said each of said pair of springs, said each of said pair of springs comprising a plurality of dished washers arranged in concavely confronting pairs.

4. In a vehicle having steerable wheels each rotatable about a steering axis, the combination including steering means operable for steering each wheel, steering linkage means connected to each wheel and to said steering means for moving each wheel about its steering axis responsively to actuation of said steering means, said steering linkage means including each of a plurality of spring means individually to one wheel for resiliently resisting the rotation of that one of the wheels about its steering axis responsively to reverse steering loads thereon, said spring means including a connecting tube assembly comprising a connecting tube secured at one end to a first end of an enlarged diameter outer shell, said spring means further including a connecting rod movable coaxially telescopically within said connecting tube and said outer shell, a drive ring extending radially outwardly from and fixedly secured to said connecting rod at a point within said outer shell, a first spring located upon said connecting rod within said outer shell between said drive ring and said first end of said outer shell, a second spring disposed in opposition to said first spring and located upon said connecting rod between said drive ring and the opposite end of said outer shell, a cap member threadably secured into said opposite end of said outer shell and being movable axially into engagement with said second spring for applying a preselected preload to said first and said second springs, said first and said second springs comprising a plurality of dished washers arranged in concavely confronting pairs with each of said washers having an outside diameter approximately equal to the inside diameter of said housing and an inside diameter approximately equal to the outside diameter of said connecting rod.

References Cited in the file of this patent

UNITED STATES PATENTS

| | | |
|---|---|---|
| 1,773,986 | Frazier | Aug. 26, 1930 |
| 1,928,816 | Grayson | Oct. 3, 1933 |
| 2,562,595 | Blue | July 31, 1951 |
| 2,652,263 | Varnum | Sept. 15, 1953 |
| 2,908,507 | Blanks et al. | Oct. 13, 1959 |
| 2,912,564 | Deffenbaugh et al. | Nov. 10, 1959 |
| 3,010,713 | Turkovich | Nov. 28, 1961 |